United States Patent
Edwards et al.

(10) Patent No.: US 6,810,275 B2
(45) Date of Patent: Oct. 26, 2004

(54) HAND-HELD COMMUNICATION DEVICE WITH VERTICALLY ORIENTED ANTENNA

(75) Inventors: David W. Edwards, Scottsdale, AZ (US); Kenneth H. Schmidt, Mesa, AZ (US); Richard E. Grams, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 714 days.

(21) Appl. No.: 09/742,032

(22) Filed: Dec. 20, 2000

(65) Prior Publication Data

US 2002/0077160 A1 Jun. 20, 2002

(51) Int. Cl.[7] .................................................. H04B 1/38
(52) U.S. Cl. .............................. 455/575.3; 455/575.1; 455/575.7; 455/575.8; 455/550.1; 455/90.3; 455/97; 343/702; 379/433.01
(58) Field of Search .......................... 455/575.3, 575.1, 455/575.7, 575.8, 550.1, 90.3, 97; 379/433.01; 343/702

(56) References Cited

U.S. PATENT DOCUMENTS

| | | | | |
|---|---|---|---|---|
| 5,255,001 A | * | 10/1993 | Tamura et al. | 343/702 |
| 5,260,998 A | * | 11/1993 | Takagi | 379/433.13 |
| 5,535,435 A | * | 7/1996 | Balzano et al. | 455/575.7 |
| 5,613,224 A | * | 3/1997 | Auvray | 455/575.7 |
| 5,630,211 A | * | 5/1997 | Nagai | 455/575.7 |
| 5,640,689 A | * | 6/1997 | Rossi | 455/575.7 |
| 6,405,061 B1 | * | 6/2002 | Bae | 455/566 |
| 2003/0160726 A1 | * | 8/2003 | Grant et al. | 343/702 |

FOREIGN PATENT DOCUMENTS

| | | | | |
|---|---|---|---|---|
| JP | 404368023 A | * | 12/1992 | 455/269 |

* cited by examiner

Primary Examiner—Vivian Chin
Assistant Examiner—Minh D. Dao
(74) Attorney, Agent, or Firm—Frank J. Bogacz

(57) ABSTRACT

A hand-held communication device with vertically oriented antenna includes a housing with a main body and a cover hingedly attached to the main body for movement between a closed position and an open position. The main body has a control surface enclosed by the cover in the closed position and accessible for operation with the cover in the open position. An antenna is movably affixed to the cover so as to form a portion of the cover with the cover in the closed position and to extend generally vertically from the cover with the cover in the open position and the communication device housing held in an operative orientation.

20 Claims, 3 Drawing Sheets

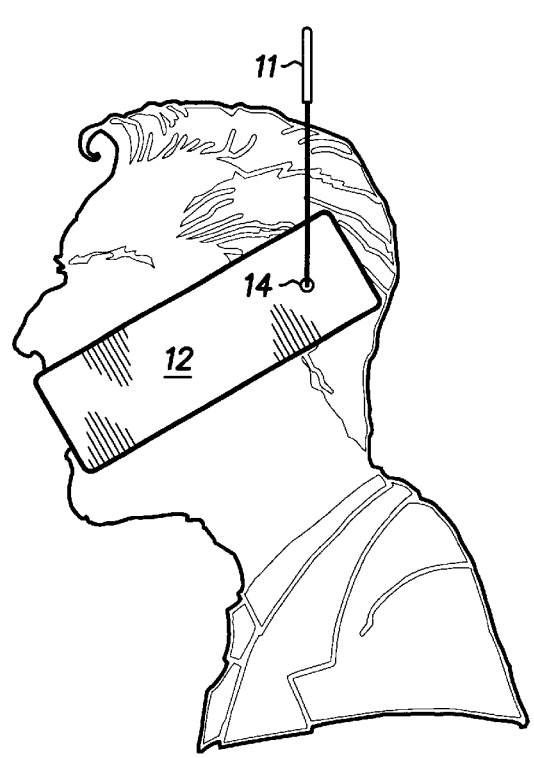
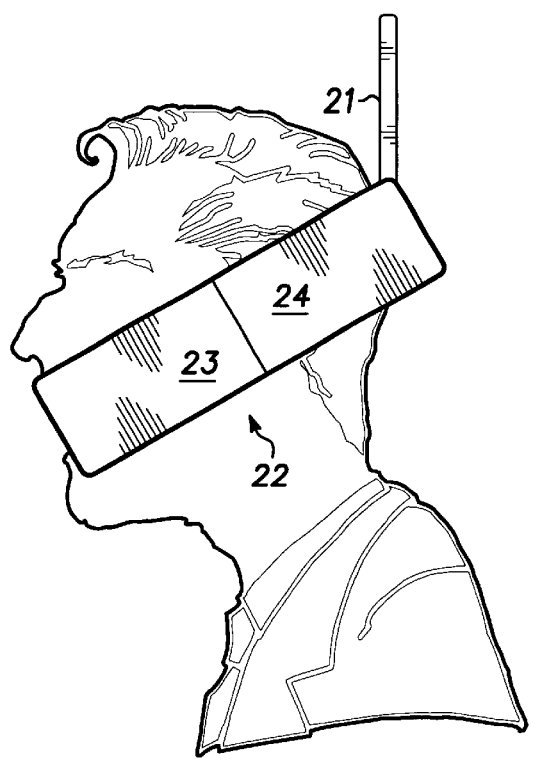
FIG. 1
- PRIOR ART -
FIG. 2
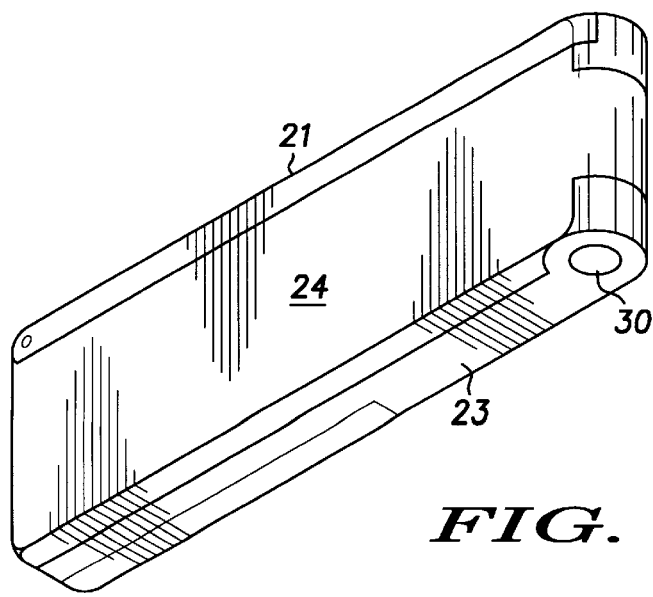
FIG. 3

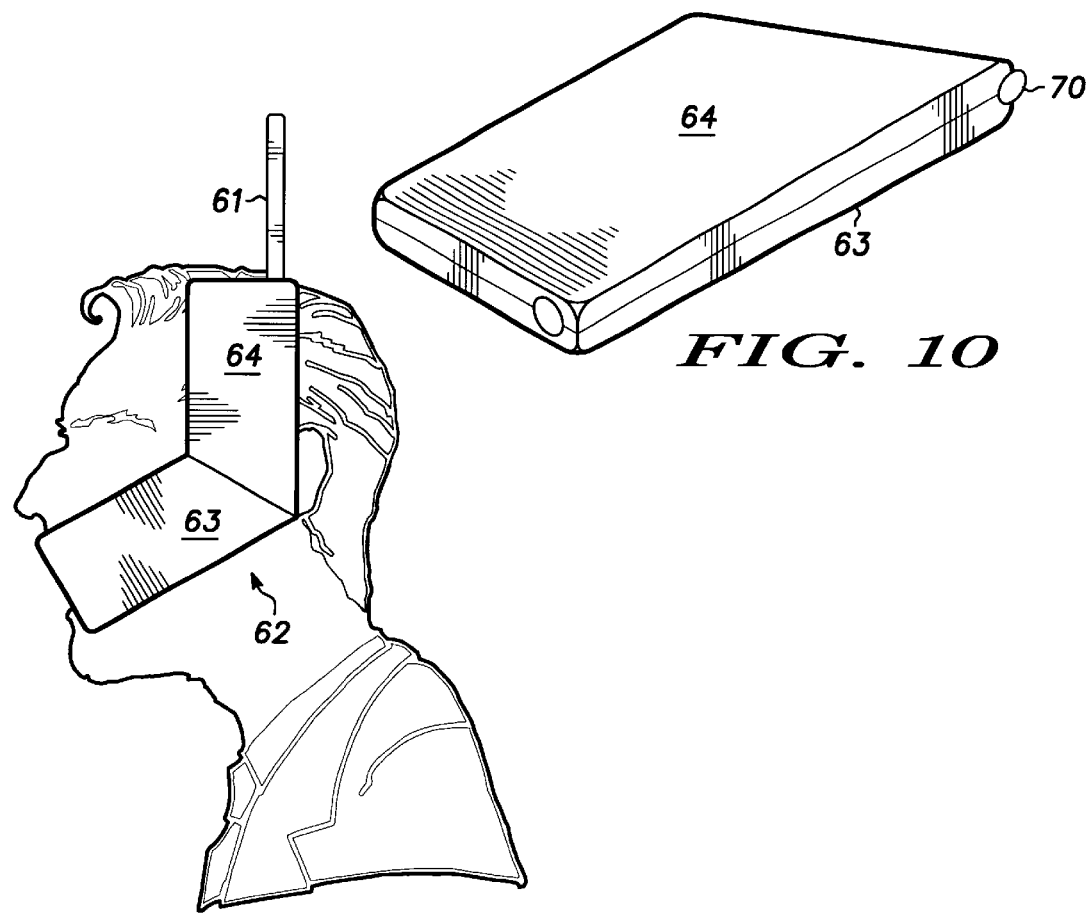
FIG. 10
FIG. 6
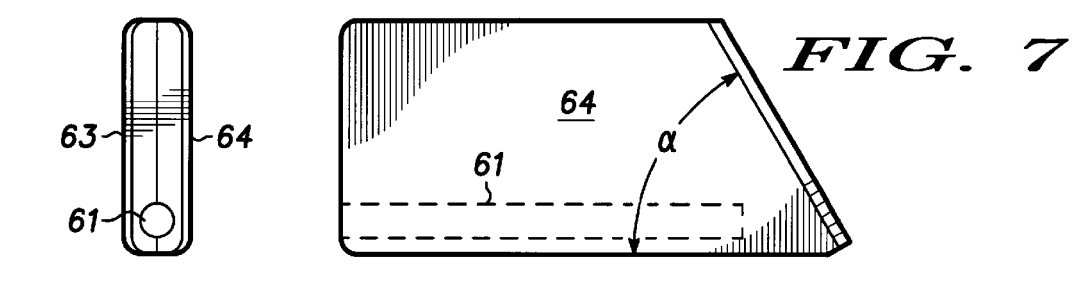
FIG. 7
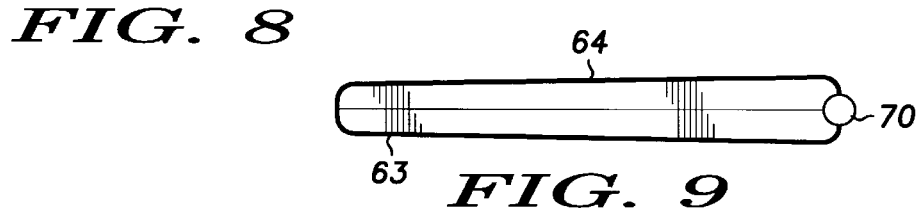
FIG. 8
FIG. 9

HAND-HELD COMMUNICATION DEVICE WITH VERTICALLY ORIENTED ANTENNA

FIELD OF THE INVENTION

This invention relates to communication apparatus requiring an antenna with a specific orientation and more particularly to hand-held communication devices with vertically oriented antennas.

BACKGROUND OF THE INVENTION

At the present time, hand-held communication devices, such as remote telephones, cellular telephones, two-way radios, etc. are very popular. Further, hand-held communication devices are generally very small so that they can be conveniently carried and operated. Very small hand-held devices dictate the use of low power. To maximize the transmission of a signal from a transmitter to a remote receiver in low power conditions, it is often expedient to provide an omnidirectional antenna pattern. In such conditions the signal is maximized by orienting the antenna vertical relative to the earth.

Further, it is generally desirable for the antenna to extend above the user's head. In these situations, the receiver generally must have a swivel antenna that can be oriented vertically as the user places the receiver in a normal position adjacent his ear. Also, the antenna is generally of the extendable type so that the user must first extend the antenna to its full length and then swivel it into the correct position. Many of the present satellite phones are considered too large as a practical traveling package. This is in part due to the form factor created by a large back-mounted antenna and a long phone housing body.

Accordingly it is highly desirable to provide vertically oriented antennas in hand-held communication devices having small practical traveling bodies.

BRIEF DESCRIPTION OF THE DRAWINGS

Referring to the drawings:

FIG. 1 is a simplified side view of a prior art handheld satellite phone and antenna in an operative orientation;

FIG. 2 is a simplified side view of an embodiment of a hand-held communication device with a vertically oriented antenna, in an operative orientation, in accordance with the present invention;

FIG. 3 is an enlarged isometric view of the hand-held communication device with vertically oriented antenna of FIG. 2 in a closed position;

FIG. 6 is a simplified side view of another embodiment of a hand-held communication device with a vertically oriented auto-positioned antenna, in an operative orientation, in accordance with the present invention;

FIG. 7 is an enlarged view in top plan of the handheld communication device with vertically oriented auto-positioned antenna of FIG. 6, in the closed position;

FIG. 8 is an end view of the hand-held communication device with vertically oriented auto-positioned antenna of FIG. 7;

FIG. 9 is a side view of the hand-held communication device with vertically oriented auto-positioned antenna of FIG. 7; and FIG. 10 is an isometric view of the hand-held communication device with vertically oriented auto-positioned antenna of FIG. 7.

DESCRIPTION OF THE PREFERRED EMBODIMENT

Referring to FIG. 1, a simplified side view is illustrated of a prior art hand-held satellite phone 10 and antenna 11 in an operative orientation. In this specific example, phone 10 has a body 12 to which antenna 11 is connected by a swivel 14 so that antenna 11 can be oriented vertically as the user places the receiver in the operative position with a microphone adjacent his mouth and a speaker adjacent his ear. Also, antenna 11 is extendable so that the user must first extend the antenna to its full length and then swivel it into the correct position. Further, as illustrated, body 12 must be sufficiently large to support antenna 11 in a stowed position and to allow antenna 11 to extend above the user's head (as shown) in the operative position adjacent his ear.

Figure 4:
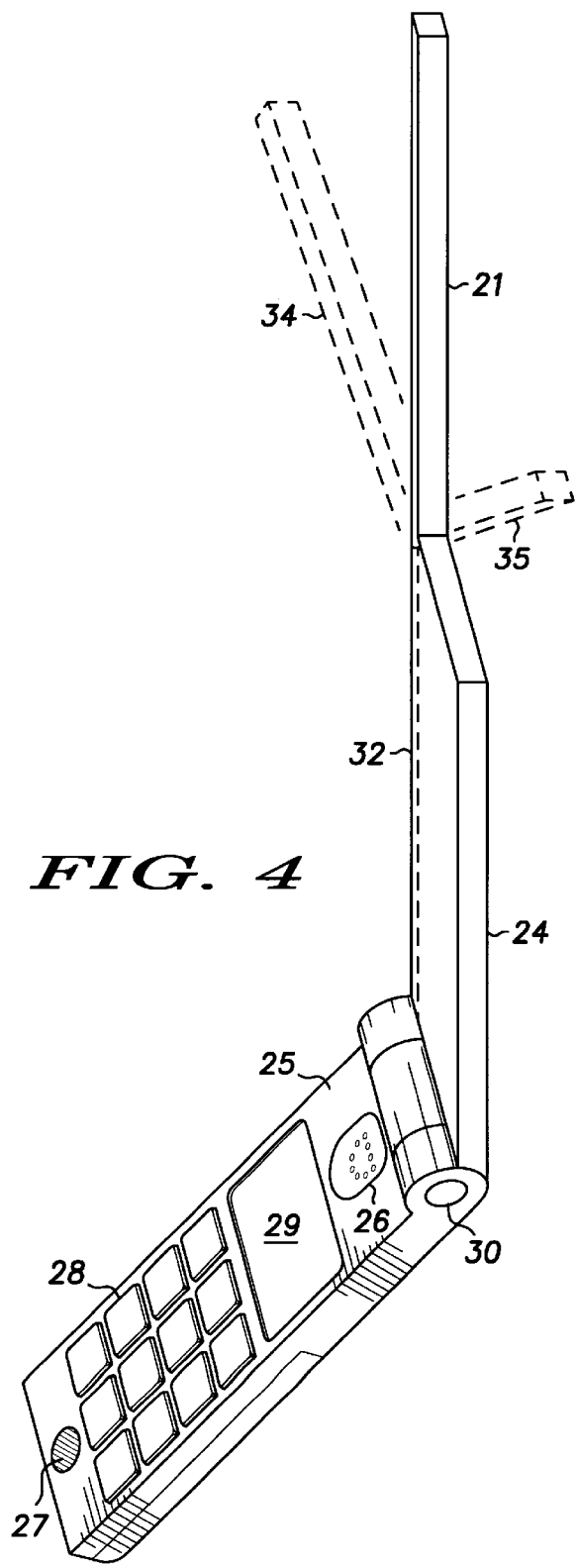
FIG. 4 is an isometric view of the hand-held communication device with vertically oriented antenna of FIG. 2 in an open position.
Figure 5:
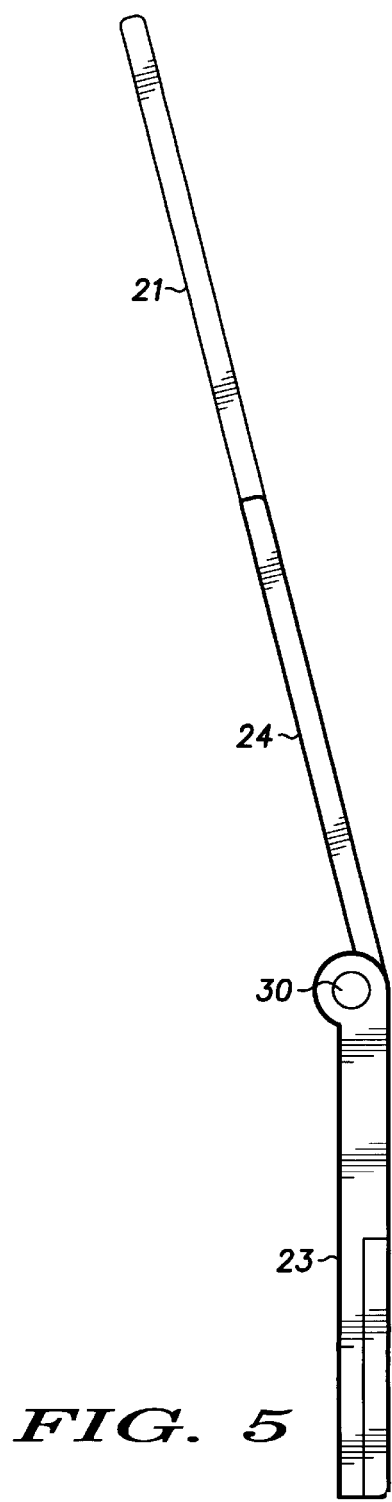
FIG. 5 is a side view of the hand-held communication device with vertically oriented antenna of FIG. 3.

Turning now to FIG. 2, an embodiment of a hand-held communication device 20 with a vertically oriented antenna 21, in accordance with the present invention, is illustrated in an operative orientation. Communication device 20 includes a housing 22 with a main body 23 and a cover 24. Main body 23 is generally constructed with an elongated configuration defining a longitudinal axis and a transverse axis. In FIG. 4, a control surface 25 includes a speaker 26 and a microphone 27 spaced apart along the longitudinal axis. Control surface 25 may include additional controls, such as a keypad 28, a display 29, etc., depending upon the specific type of hand-held communication device used. Control surface 25 of main body 23 is enclosed by cover 24 in the closed position (FIG. 3) and accessible for operation with cover 24 in the open position (FIGS. 4 and 5).

Cover 24 is hingedly attached to main body 23 for movement between the closed position and the open position by means of a hinge 30. Hinge 30 is located at an upper end of main body 23 and a lower end of cover 24, in the operative orientation, and extends along the transverse axis of main body 23 perpendicular to the longitudinal axis of main body 23 and the longitudinal axis of cover 24. Thus, in this embodiment, cover 24 folds or closes lengthwise over main body 23 to enclose control surface 25.

In this specific embodiment, antenna 21 is pivotally attached to an upper end of cover 24 for movement between a stowed orientation designated 32 in FIG. 4 and a vertical operative orientation, illustrated as two different possible positions in FIG. 4. Movably affixed antenna 21 is pivotally attached to the upper end of cover 24 for movement about a pivot generally perpendicular to the transverse axis of cover 24. A first position, designated 34, is designed to accommodate right-hand users and a second position, designated 35, is designed to accommodate left-hand users. In each of these positions, when main body 23 is in an operative orientation with speaker 26 adjacent the user's ear and microphone 27 adjacent the user's mouth, antenna 21 is pivoted into the vertical operative orientation, as illustrated in FIG. 2.

As explained briefly above, the antenna of certain hand-held devices, such as satellite phones, must extend above the user's head. Because of the novel construction of hand-held communication device 20, cover 24 operates as an extender for antenna 21, placing at least a substantial portion of antenna 21 above the user's head in the operative orientation. Cover 24 extends beyond the user's ear so that it provides the highest possible antenna base without requiring an antenna extension or the like. In the stowed position (32), antenna 21 appears as a portion of cover 24. Thus, cover 24 tends to conceal the size of the necessarily large antenna 21 while also operating to protect control surface 25 in the closed position. Further, in most embodiments cover 24 can contain some electronics, e.g., the RF portions, with electrical signals and power being routed through hinge 30 on well known conductors designed for this purpose.

Turning now to FIG. 6, an embodiment of a hand-held communication device 60 with a vertically oriented antenna 61, in accordance with the present invention, is illustrated in an operative orientation. Communication device 60 includes a housing 62 with a main body 63 and a cover 64. Main body 63 is generally constructed with an elongated configuration defining a longitudinal axis and a transverse axis. A control surface (not visible) includes a speaker and a microphone spaced apart along the longitudinal axis and may include additional controls, such as a keypad, a display, etc., depending upon the specific type of hand-held communication device used. The control surface of main body 63 is enclosed by cover 64 in the closed position (FIGS. 7, 8, 9, and 10) and accessible for operation with cover 64 in the open position (FIG. 6).

Cover 64 is hingedly attached to main body 63 for movement between the closed position and the open position by means of a hinge 70. Hinge 70 is located at an upper end of main body 63 and a lower end of cover 64, in the operative orientation, and extends along an angular axis generally transverse to main body 63 and at an angle α to the longitudinal axis of main body 63 and the longitudinal axis of cover 64. The specific angle α of the angular axis depends upon the design of main body 63 and is designed so that antenna 61 is substantially vertical with main body 63 in an operative orientation with the speaker adjacent the user's ear and the microphone adjacent the user's mouth. The angular axis will generally be approximately 45O, but may vary anywhere within a range of approximately 30° to 60°. Thus, in this embodiment, cover 64 folds or closes lengthwise over main body 63 to enclose the control surface.

In this specific embodiment, antenna 61 is pivotally attached adjacent to an upper end of cover 64 for movement between a stowed orientation and a vertical operative orientation. Antenna 61 is an auto positioning, internal pivoting antenna which is situated in cover 64 so as to be in the stowed position when cover 64 is closed and which is extended when cover 64 is opened. Movably affixed antenna 61 is pivotally attached adjacent to the upper end of cover 64. When cover 64 is in the open position and main body 63 is in an operative orientation with the speaker adjacent the user's ear and the microphone adjacent the user's mouth, antenna 61 is pivoted into the vertical operative orientation, as illustrated in FIG. 6.

Because of the novel construction of hand-held communication device 60, cover 64 operates as an extender for antenna 61, placing at least a substantial portion of antenna 61 above the user's head in the operative orientation. Cover 64 extends beyond the user's ear so that it provides the highest possible antenna base without requiring an antenna extension or the like. In the stowed position, antenna 61 is enclosed by cover 64 and main body 63 and is out of sight. Thus, main body 63 and cover 64 tend to conceal the size of the necessarily large antenna 61 while also operating to protect the control surface in the closed position. Further, in most embodiments cover 64 can contain some electronics, e.g., the RF portions, with electrical signals and power being routed through hinge 70 on well known conductors designed for this purpose.

Shown in FIG. 6 is a configuration for left hand use. This embodiment has the option of adding one more microphone and one more speaker to the outside surface of main body 63. This would allow the use of this embodiment for the right hand user.

Thus, specific embodiments of a hand-held communication device with vertically oriented antenna are disclosed. In each embodiment, a cover and a main body are hingedly coupled to provide a compact closed position in which the antenna and any controls are completely hidden and protected. Also, in each embodiment, the cover swings away from the main body to extend above a user's ear and provide a high platform for the antenna. In each embodiment the antenna is attached adjacent an upper end of the cover (in the open position) so as to extend vertically above the user's head in the open or extended position. Further, in each embodiment the cover and the antenna have a combined length such that at least a portion of the antenna extends above a user's head in the operative orientation.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A hand-held communication device with vertically oriented antenna comprising:

a communication device housing including a main body and a cover hingedly attached to the main body for movement between a closed position and an open position, the main body having a control surface enclosed by the cover in the closed position and accessible for operation with the cover in the open position; and an antenna pivotally affixed to the cover so as to form a portion of the cover with the cover in the closed position and to extend substantially vertically from the cover with the cover in the open position and the communication device housing held in an operative orientation.

2. A hand-held communication device with vertically oriented antenna as claimed in claim 1 wherein the control surface of the main body includes a microphone and a spaced apart speaker.

3. A hand-held communication device with vertically oriented antenna as claimed in claim 1 wherein the cover includes some electronics components.

4. A hand-held communication device with vertically oriented antenna as claimed in claim 1 wherein the main body and the cover are hingedly attached together along a transverse axis perpendicular to a longitudinal axis of the main body and a longitudinal axis of the cover, and the transverse axis being located and at an upper end of the main body and a lower end of the cover in the operative orientation.

5. A hand-held communication device with vertically oriented antenna as claimed in claim 4 wherein the movably affixed antenna is pivotally attached to an upper end of the cover, the antenna being pivotal between a stowed orientation and a vertical operative orientation.

6. A hand-held communication device with vertically oriented antenna as claimed in claim 5 wherein the movably affixed antenna is pivotally attached to the upper end of the cover for movement about a pivot generally perpendicular to the transverse axis.

7. A hand-held communication device with vertically oriented antenna as claimed in claim 6 wherein the cover and the antenna have a combined length such that at least a portion of the antenna extends above a user's head in the operative orientation.

8. A hand-held communication device with vertically oriented antenna as claimed in claim 1 wherein the main body and the cover are hingedly attached together along an angled axis extending at an angle to a longitudinal axis of the main body and a longitudinal axis of the cover, and the angled axis being located and at an upper end of the main body and a lower end of the cover in the operative orientation.

9. A hand-held communication device with vertically oriented antenna as claimed in claim 8 wherein the angled axis extends at an angle to the longitudinal axis of the main body and the longitudinal axis of the cover in a range of 30° to 60°.

10. A hand-held communication device with vertically oriented antenna as claimed in claim 9 wherein the movably affixed antenna is attached to the cover so as to extend from an upper end of the cover generally vertically, the antenna being movable between a stowed orientation within the cover and a vertical operative orientation extending generally vertically from the cover.

11. A hand-held communication device with vertically oriented antenna as claimed in claim 10 wherein the cover and the antenna have a combined length such that at least a portion of the antenna extends above a user's bead in the operative orientation.

12. A hand-held communication device with vertically oriented antenna comprising:

a communication device housing including a main body and a cover hingedly attached to the main body for movement between a closed position and an open position, the main body having a control surface enclosed by the cover in the closed position and accessible for operation with the cover in the open position;

an antenna pivotally affixed to the cover so as to form a portion of the cover with the cover in the closed position and to extend substantially vertically from the cover with the cover in the open position and the communication device housing held in an operative orientation;

the main body and the cover being hingedly attached together along an angled axis extending at an angle to a longitudinal axis of the main body and a longitudinal axis of the cover, and the angled axis being located adjacent an upper end of the main body and a lower end of the cover in the operative orientation; and the pivotally affixed antenna being attached adjacent an upper end of the cover so as to be movable between a stowed orientation and a vertical operative orientation.

13. A hand-held communication device with vertically oriented antenna as claimed in claim 12 wherein the control surface of the main body includes a microphone and a spaced apart speaker.

14. A hand-held communication device with vertically oriented antenna as claimed in claim 12 wherein the cover includes some electronics components.

15. A hand-held communication device with vertically oriented antenna as claimed in claim 12 wherein the main body and the cover are hingedly attached together along a transverse axis perpendicular to a longitudinal axis of the main body and a longitudinal axis of the cover, and the transverse axis is located adjacent an upper end of the main body and a lower end of the cover in the operative orientation.

16. A hand-held communication device with vertically oriented antenna as claimed in claim 15 wherein the movably pivotally affixed antenna is pivotally attached to an upper end of the cover for movement about a pivot generally perpendicular to the transverse axis.

17. A hand-held communication device with vertically oriented antenna as claimed in claim 12 wherein the angled axis extends at an angle to the longitudinal axis of the main body and the longitudinal axis of the cover in a range of 30 to 60°.

18. A hand-held communication device with vertically oriented antenna comprising:

a communication device housing including a main body and a cover hingedly attached to the main body for movement between a closed position and an open position, the main body having a control surface enclosed by the cover in the closed position and accessible for operation with the cover in the open position;

an antenna pivotally affixed to the cover so as to form a portion of the cover with the cover in the closed position and to extend substantially vertically from the cover with the cover in the open position and the communication device housing held in an operative orientation;

the main body and the cover being hingedly attached together along an angled axis extending at an angle to a longitudinal axis of the main body and a longitudinal axis of the cover, and the angled axis being located adjacent an upper end of the main body and a lower end of the cover in the operative orientation;

the pivotally affixed antenna being attached adjacent an upper end of the cover so as to be movable between a stowed orientation and a vertical operative orientation; and the cover and the antenna have a combined length such that at least a portion of the antenna extends above a user's head in the operative orientation.

19. A hand-held communication device with vertically oriented antenna as claimed in claim 18 wherein the main body and the cover are hingedly attached together along the angled axis perpendicular to a longitudinal axis of the main body and a longitudinal axis of the cover, and the angled axis is located adjacent an upper end of to main body and a lower end of the cover in the operative orientation.

20. A hand-held communication device with vertically oriented antenna as claimed in claim 18 wherein the angled axis extends at an angle to the longitudinal axis of the main body and to longitudinal axis of the cover in a range of 30° to 60°.

* * * * *